United States Patent [19]

Nojiri

[11] Patent Number: 5,032,710
[45] Date of Patent: Jul. 16, 1991

[54] PHOTODETECTOR TO DETECT A LIGHT IN DIFFERENT WAVELENGTH REGIONS THROUGH CLAD LAYER HAVING DIFFERENT THICKNESS PORTIONS

[75] Inventor: Hidetoshi Nojiri, Hadano, Japan

[73] Assignee: Canon Kabushiki Kaisha, Tokyo, Japan

[21] Appl. No.: 410,513

[22] Filed: Sep. 21, 1989

[30] Foreign Application Priority Data

Sep. 22, 1988 [JP] Japan .................................. 63-236215
Sep. 22, 1988 [JP] Japan .................................. 63-236216

[51] Int. Cl.$^5$ ................................................ G01J 3/50
[52] U.S. Cl. ................................ 250/226; 250/227.23; 350/96.11; 350/96.14
[58] Field of Search ............... 250/226, 227.18, 227.23, 250/208.2, 211 J; 350/96.11, 96.12, 96.13, 96.14

[56] References Cited

U.S. PATENT DOCUMENTS

4,279,464 7/1981 Colombini .......................... 350/96.11
4,372,641 2/1983 Johnson et al. .................... 350/96.12
4,778,987 10/1988 Saaski et al. ..................... 250/227.18

Primary Examiner—David C. Nelms
Attorney, Agent, or Firm—Fitzpatrick, Cella, Harper & Scinto

[57] ABSTRACT

A photodetector comprises a waveguide layer to propagate lights, a clad layer which is laminated onto the waveguide layer and has a refractive index smaller than that of the waveguide layer, the clad layer having at least two portions having different thicknesses, and photoelectric converting devices which are respectively provided on the surfaces of the different thickness portions of the clad layer on the side opposite to the side which faces the waveguide layer.

10 Claims, 6 Drawing Sheets

FIG.1

PRIOR ART

PHOTODETECTOR TO DETECT A LIGHT IN DIFFERENT WAVELENGTH REGIONS THROUGH CLAD LAYER HAVING DIFFERENT THICKNESS PORTIONS

BACKGROUND OF THE INVENTION

1. Field of the Invention

The present invention relates to a photodetector in which the wavelength multiplexed light is selected every wavelength region and each of the selected in lights is converted into the electric signal which is outputted. Such a photodetector can be suitably used for a receiver or the like in a wavelength multiplex optical communication.

2. Related Background Art

Figure 1:
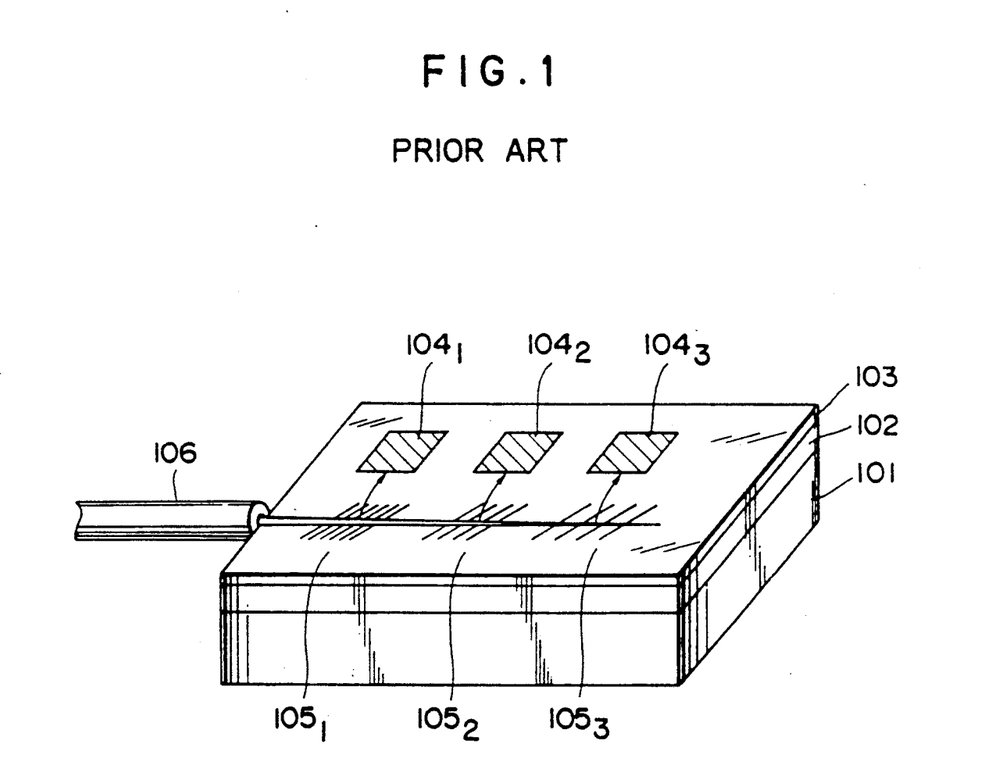
FIG. 1 is a schematic perspective view showing a conventional wavelength selective type photodetector.

FIG. 1 is a schematic perspective view showing a structure of a conventional photodetector of the wavelength selective type.

A buffer layer 102 and a slab type optical waveguide 103 are formed on a substrate 101. An edge surface of an optical fiber 106 is coupled to the optical waveguide 103. Photodetectors $104_1$ to $104_3$ and gratings $105_1$ to $105_3$ are formed on the upper surface of the optical waveguide 103. The optical fiber 106 guides the wavelength multiplexed light signal. The signal light is input to the slab type optical waveguide 103 by the edge surface coupling.

The gratings $105_1$ to $105_3$ as reflective type filters which are arranged like an array in a cascade form diffract only the lights of the wavelengths which satisfy the Bragg conditions which are determined by an incident angle and a period among the incident lights. The lights selected in accordance with the wavelength regions as mentioned above are respectively photoelectrically converted by the photodetectors $104_1$ to $104_3$ provided for the gratings and are output as electric signals.

However, the photodetector as mentioned above has the following problems.

(I) In the case of selecting the light of a short wavelength, the period of the gratings must be set to a very small value and it is difficult to manufacture such gratings.

(II) Since a whole length of the gratings needs to be set to a value within a range from 100 μm to hundreds of μm, there is a limitation when the photodetector is miniaturized.

(III) Since the gratings have a two-dimensional extent, the matching with a three-dimensional (channel type) waveguide is not good.

SUMMARY OF THE INVENTION

It is an object of the present invention to solve the problem in the above conventional techniques and to provide a wavelength selective type photodetector which can be easily manufactured and is suitable for miniaturization.

The object of the invention is accomplished by a photodetector comprising: a waveguide layer to propagate a light; a clad layer which is laminated onto the waveguide layer and has a refractive index smaller than that of the waveguide layer and has at least two portions having different thicknesses; and photoelectric converting devices which are respectively provided on the surfaces of the different thickness portions of the clad layer on the side opposite to the side which faces the waveguide layer.

BRIEF DESCRIPTION OF THE DRAWINGS

FIG. 6 is a schematic cross-sectional view

DETAILED DESCRIPTION OF THE PREFERRED EMBODIMENTS

Figure 2:
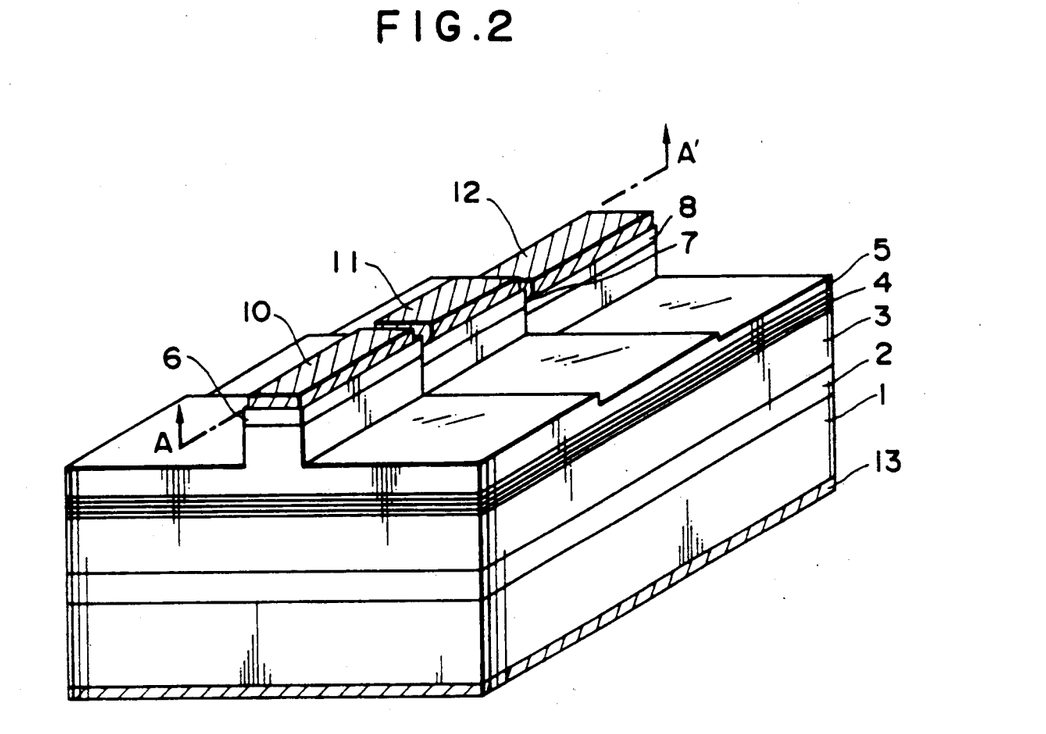
FIGS. 2 and 3 are a schematic perspective view and a schematic cross sectional view showing the first embodiment of the photodetector of the invention.
Figure 3:
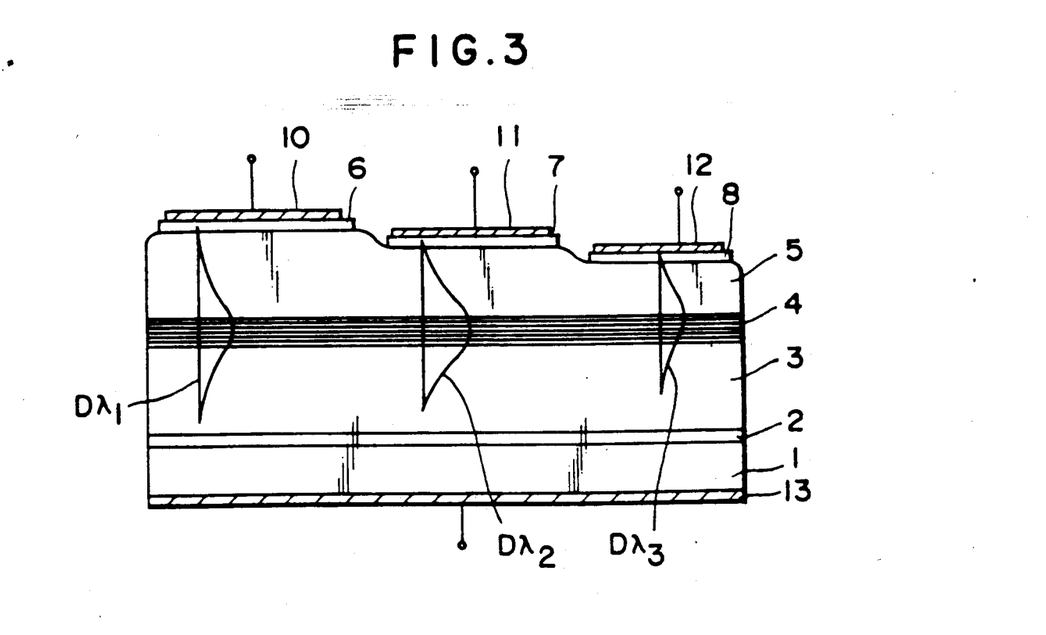

FIG. 2 is a schematic perspective view showing the first embodiment of a photodetector of the present invention. FIG. 3 is a schematic cross-sectional view taken along the line A—A' in FIG. 2 of the photodetector.

First, a manufacturing procedure of the embodiment will be described.

A crystalline layer of n-type GaAs is grown as a buffer layer 2 on a substrate 1, comprising n-type GaAs having a thickness of 0.5 μm. Next, an n-type $Al_{0.5}Ga_{0.5}As$ layer is grown as a clad layer 3 having a thickness of 2 μm. Subsequently, a non-doped GaAs layer of 30 Å and a non-doped $Al_{0.5}Ga_{0.5}As$ layer of 60 Å are alternately laminated thirty times each comprising such two kinds of layers, thereby forming a waveguide layer 4 having a thickness of 0.27 um. Further, a p-type $Al_{0.5}Ga_{0.5}As$ crystalline layer of a thickness of 1 μm is grown as an upper clad layer 5. A crystal growing method such as, a molecular beam epitaxy process, a chemical vapor deposition (CVD) process, or the like was used.

For the film formed wafer as mentioned above, the upper clad layer 5 is etched by using ordinary photolithography and etching, for instance, by using an etchant of $H_2O_2:NH_4F=200:1$, thereby forming stairway-shaped height different portions as shown in the diagram. Thereafter, P+-GaAs layers are grown as absorbing layers 6, 7, and 8 on the respective stages of the stairway portions. Further, in order to improve the light shut-in efficiency of the guide light to the vertical direction of each layer, a stripe-shaped convex portion is formed on the upper surface of the wafer, thereby constructing a ridge-shaped structure. In this way, a three-dimensional (channel type) waveguide is formed. Thereafter, upper electrodes 10, 11 and 12 are formed on the respective stages and a lower electrode 13 is formed under the bottom surface of the wafer. The dimensions of the above portions are set as follows.

Thicknesses of the stages of the clad layer 5 were set to 0.3 μm, 0.27 μm and 0.25 μm by considering that the guide light to be detected is a light in which three wavelengths of 750 mm, 800 mm and 850 mm were multiplexed, respectively. A width of the ridge portion was set to about 3 μm. A size of the electrode of each detecting section was set to 3 μm×100 μm. In the embodiment, the electrode is set to an enough large size so that a wire bonding process can be executed.

The operation will now be described by assuming that the wavelength multiplexed light progresses from the right edge surface to the left edge surface in FIG. 2.

The relations between the refractive indices $n_s$ and $n_c$ of the clad layers 3 and 5 and a refractive index $n_f$ of the waveguide layer 4 are expressed as follows.

$$n_f > n_s \geqq n_c$$

If the respective refractive indices satisfy the above relations, the guide light in which the wavelengths of 0.75 μm, 0.8 μm and 0.85 μm (hereinafter, sequentially referred to as $\lambda_1$, $\lambda_2$ and $\lambda_3$) at the time of the edge incidence were multiplexed is shut in the waveguide, so that the light is attenuated by only the amount due to the waveguide loss. When the guide light reaches the absorbing band under the electrode 10, the base portion of an electric field distribution $D\lambda_1$ of $\lambda_1$ is located in the absorbing layer 6, so that the energy of $\lambda_1$ is rapidly absorbed and is attenuated. The signal of $\lambda_1$ which was converted into the electrons and the holes by the absorbing layer 6 is extracted as an absorbing current by the electrodes 10 and 13, so that the signal is detected. At this time, the light energy on the side of the long wavelength is low. Therefore, the base portions of electric field distributions $D\lambda_2$ and $D\lambda_3$ of $\lambda_2$ and $\lambda_3$ do not reach the absorbing layer 6, so that the energies of $\lambda_2$ and $\lambda_3$ are not lost. The similar phenomenon also occurs in the absorbing bands 7 and 8 with respect to the guide lights of $\lambda_2$ and $\lambda_3$. An absorbing current of $\lambda_2$ is extracted between the electrodes 11 and 13. An absorbing current of $\lambda_3$ is extracted between the electrodes 12 and 13. Thus, the signals of $\lambda_2$ and $\lambda_3$ are detected.

Figure 4:
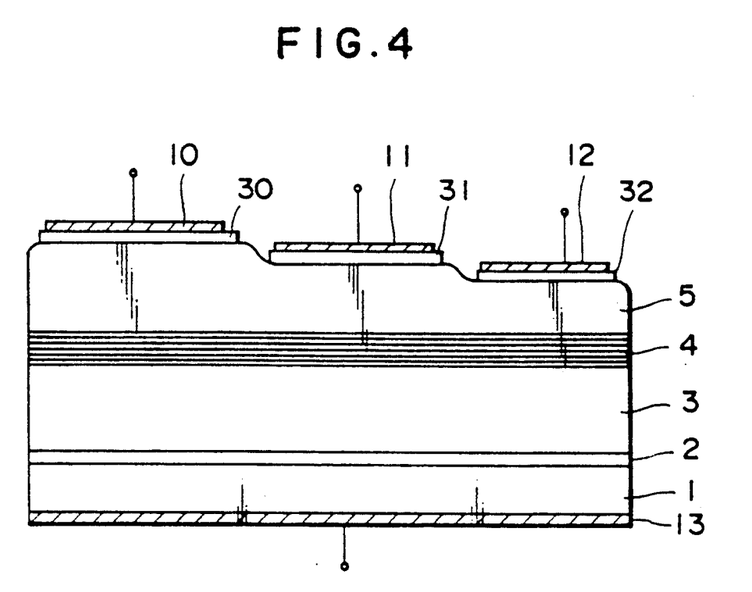
FIG. 4 is a schematic cross-sectional view showing the second embodiment of the invention.

FIG. 4 is a cross-sectional view showing a structure of the second embodiment of the invention. In the diagram, the same components as those in FIG. 3 are designated by the same reference numerals and their detailed description is omitted. In the second embodiment, by changing the construction of the absorbing layers 6, 7 and 8 used in the first embodiment, the wavelength of the guide light can be detected until a long wavelength.

Figure 5:
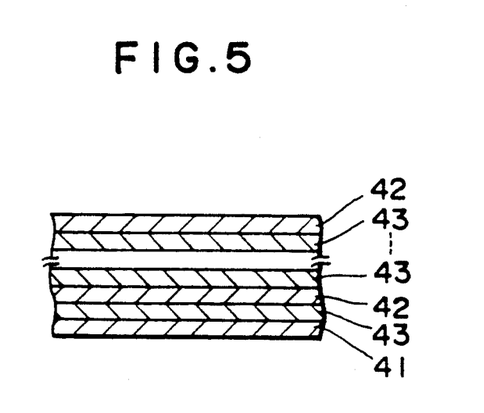
FIG. 5 is a schematic cross-sectional view showing a construction of a light absorbing layer in the second embodiment.

In FIG. 4, absorbing layers 30, 31 and 32 have an nipi structure in which a p doped GaAs layer 41, an n doped GaAs layer 42, and a non-doped GaAs layer 43 are alternately laminated as shown in a schematic cross sectional view of FIG. 5. With this structure, the energy gaps among the absorbing layers are equivalently reduced and the light on the long wavelength side of a lower energy than 0.87 μm which is known as an absorbing end of GaAs can be detected.

Figure 6:
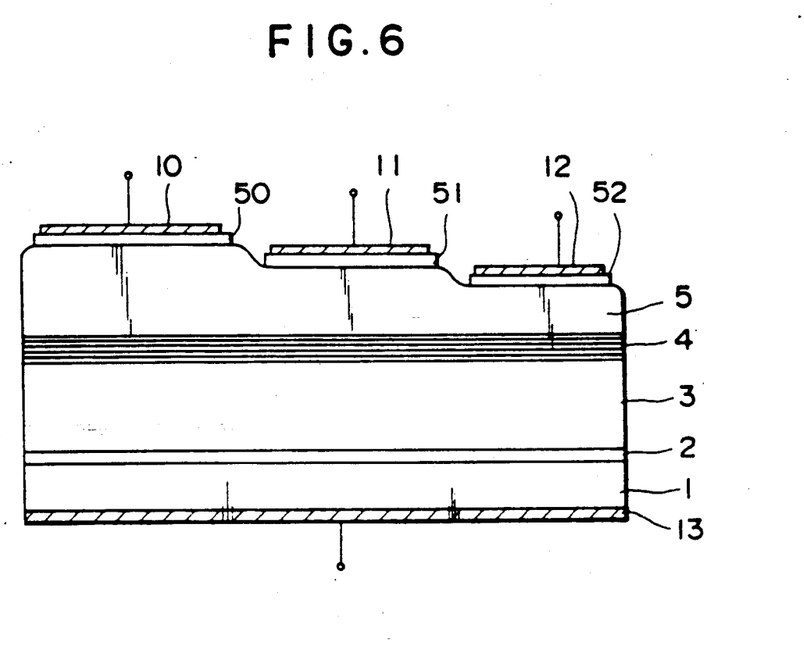
Figure 7:
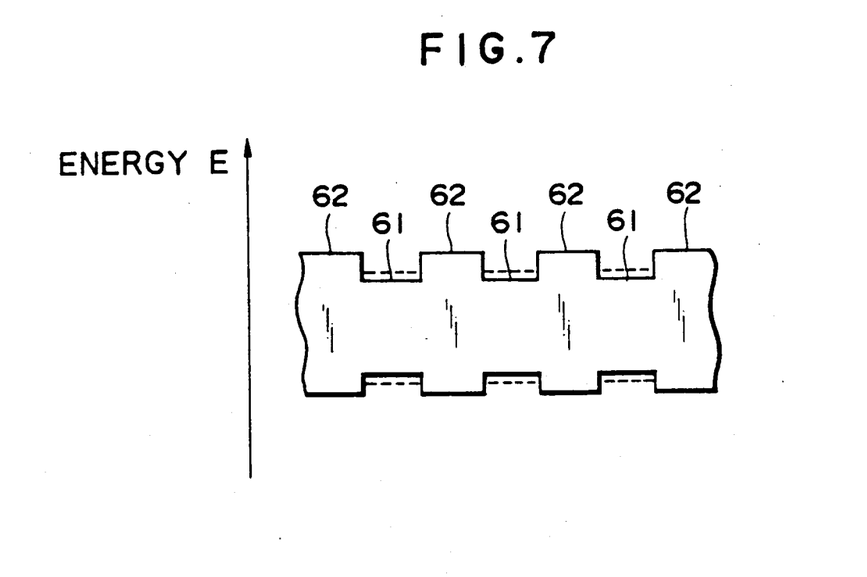
FIG. 7 is an energy band diagram showing a construction of a light absorbing layer in the third embodiment.

FIG. 6 is a cross-sectional view showing a structure of the third embodiment of the invention. In the diagram, the same components as those in FIG. 3 are designated by the same reference numerals and their detailed descriptions are omitted. In the third embodiment, absorbing layers 50, 51 and 52 have a super lattice structure in which an InGaAs layer and a GaAs layer are alternately laminated. FIG. 7 shows an energy band diagram of the absorbing layers 50 to 52. In FIG. 7, an axis of abscissa indicates a position in the thickness direction of the layer and an axis of ordinate represents an energy E. On the other hand, reference numeral 61 denotes an InGaAs well layer and 62 indicates a GaAs barrier layer. The absorbing layers of such a structure cause a quantum well effect (a broken line indicates a quantization level). On the other hand, by changing a mixed crystal ratio of In, the wavelength of the light to be detected can be changed.

In the above embodiment, the photoelectric converting devices to detect the lights of the respective wavelength regions are arranged in the propagating direction of the lights. However, the photoelectric converting devices can be also arranged in the direction perpendicular to the light propagating direction. Such an example will now be shown below.

Figure 8:
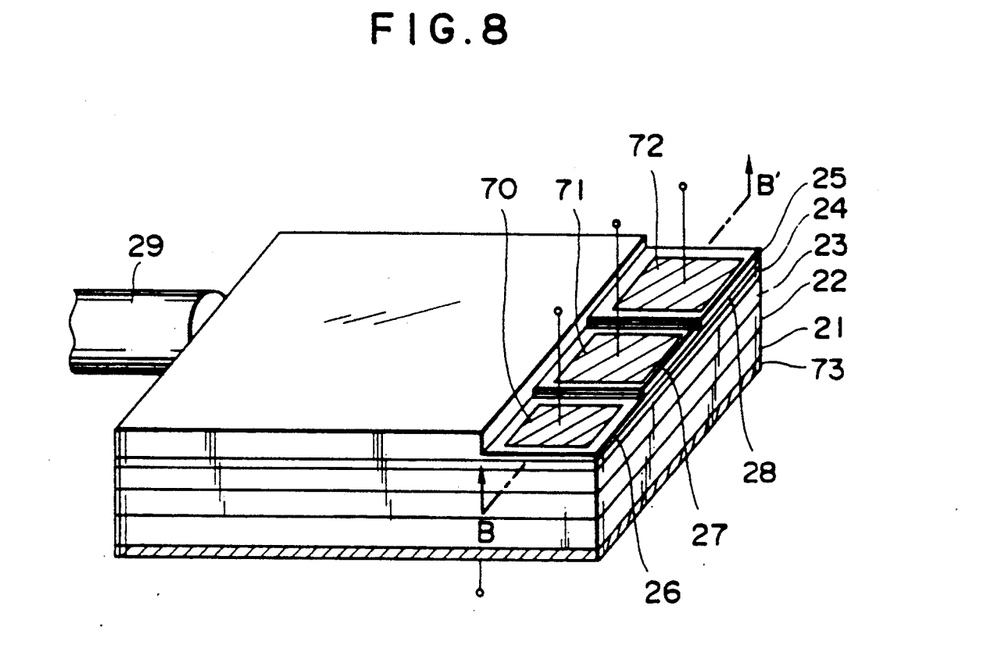
FIGS. 8 and 9 are a schematic perspective view and a schematic cross-sectional view showing the fourth embodiment of a photodetector of the invention.
Figure 9:
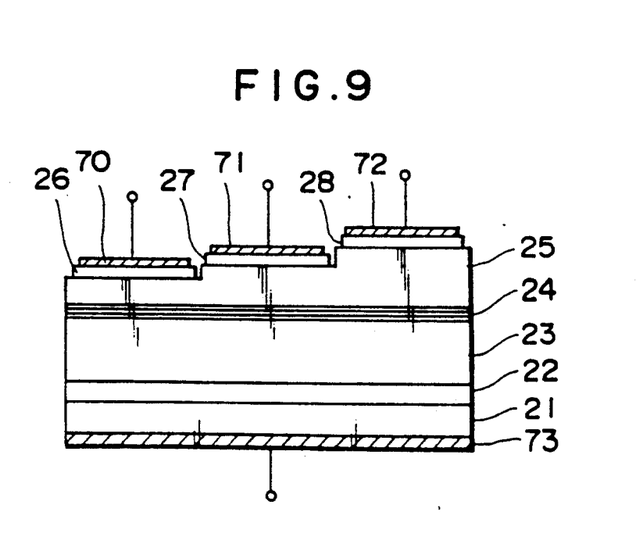

FIG. 8 is a schematic perspective view showing the fourth embodiment of a photodetector of the invention. FIG. 9 is a schematic cross-sectional view taken along the line B—B' in FIG. 8 of the photodetector.

First, a manufacturing procedure of the embodiment will be described.

A crystalline layer of an n-type GaAs buffer layer 22 of a thickness of about 0.5 μm is grown on an n-type GaAs substrate 21. Subsequently, an n-type $Al_{0.5}Ga_{0.5}As$ clad layer 23 of a thickness of 2 μm is grown. Next, thirty pairs each comprising a non-doped GaAs layer of 30 Å and a non-doped $Al_{0.5}Ga_{0.5}As$ layer of 60 Å are laminated to form a waveguide layer 24 having a thickness of about 0.27 μm. Further, a p-type $Al_{0.5}Ga_{0.5}As$ crystalline layer is grown as an upper clad layer 25 until a thickness of about 1 μm. As a crystal growing method a molecular beam epitaxy process, a chemical vapor deposition (CVD) process, or the like was used. For the film formed wafer as mentioned above, the upper clad layer 25 is etched by repeating a photolithography process and an ion beam etching process three times so as to obtain a film thickness corresponding to the differences among the electric field distributions of the guide lights, thereby forming stairway-shaped height different portions as shown in the diagrams After that, absorbing layers 26, 27, and 28 comprising P+-GaAs are grown on the respective stages of the stairway portions mentioned above Au/Cr is evaporation deposited as an upper electrode onto the wafer until a thickness of about 0.5 μm and Au-Ge/Au is also evaporation deposited onto the wafer as a lower electrode 73 under the wafer until a thickness of about 0.5 μm. Thereafter, as shown in the diagrams, the upper electrode is separated by a photolithography process using an iodine system etchant and phosphoric acid system etchant, thereby forming upper electrodes 70, 71, and 72. The dimensions of the respective portions were set as follows. The thicknesses of the respective stages of the upper clad layers were respectively set to 0.3 μm, 0.27 μm, and 0.25 μm by considering that the guide light to be detected is a light in which the wavelengths of 750 nm, 800 nm, and 850 nm were multiplexed. The size of each detecting section was set to about 20 μm×100 μm. The intervals between the electrodes 70 and 71 and between the electrodes 71 and 72 were set to about 5 μm.

The operation of the embodiment will now be described. In FIG. 8, the relations between the refractive indices $n_s$ and $n_c$ of the clad layers 23 and 25 and the refractive index $n_f$ of the waveguide layer 24 are $$n_f > n_s = > n_c$$

If the refractive indices satisfy the above relations, the guide light in which the wavelengths of $\lambda_3$ (0.75 μm), $\lambda_2$ (0.8 μm). and $\lambda_1$ (0.85 μm) were multiplexed and which is input via an optical fiber 29 is preferably shut in the waveguide at the incident edge surface. Thus, the guide light is attenuated by the amount due to only the waveguide loss. When the guide light arrives at the absorbing layers 26, 27, and 28 under the electrodes 70, 71, and 72, the base portion of the electric field distribution of the guide light is located in the absorbing layer, so that the light is rapidly attenuated. Table 1 shows the lights of the wavelengths which are absorbed by the absorbing layers.

TABLE 1

| Absorbing layer | 26 | 27 | 28 |
| --- | --- | --- | --- |
| Wavelength | $\lambda_1 + \lambda_2 + \lambda_3$ | $\lambda_1 + \lambda_2$ | $\lambda_1$ |

Figure 10:
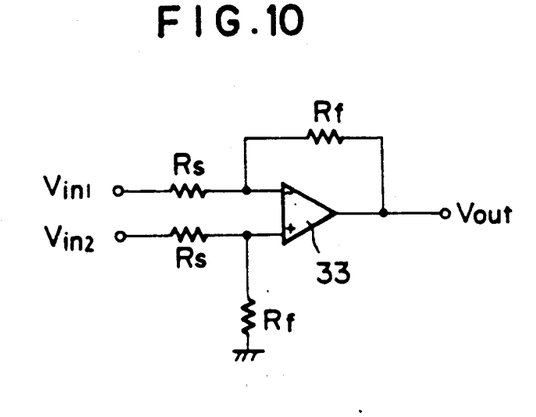
FIG. 10 is a diagram showing a circuit to separate the optical signals of respective wavelengths from an output of the photodetector of the fourth embodiment.

An absorbing current which is generated due to the signal light absorbed by each absorbing layer is measured at each electrode. FIG. 10 shows an example of a detecting circuit to separate the generated currents. In FIG. 10, the electrode 72 (that is, the signal of $\lambda_1$) is connected to an input $V_{in1}$ of an operational amplifier 33 and the electrode 71 (that is, the signal of $\lambda_1+\lambda_2$) is connected to an input $V_{in2}$. Thus, an output voltage of $V_{out}$ as shown in the following equation is derived and $V_{out}$ becomes a signal light output of $\lambda_2$.

$V_{out} = R_f/R(V_2 - V_1)$ (where, $R_f/R_s = 1$)

$V_2$: output voltage at the electrode 71
$V_1$: output voltage at the electrode 72

In a manner similar to the above, a signal light output of $\lambda_3$ is derived from the electrodes 71 and 70. As mentioned above, the signal in which the three wavelengths of $\lambda_1$, $\lambda_2$, and $\lambda_3$ were multiplexed can be detected by the separating detecting circuit.

Figure 11:
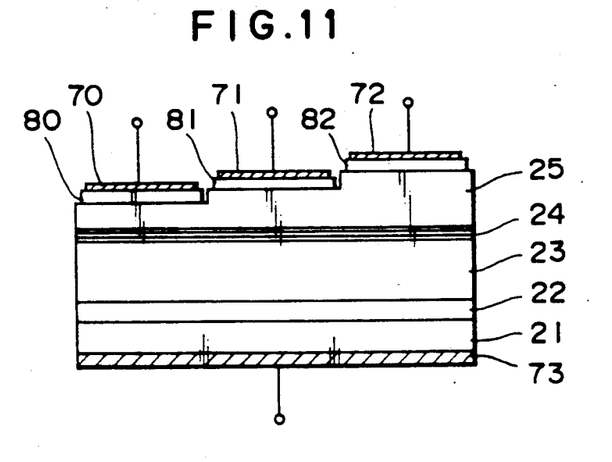
FIGS. 11 and 12 are schematic cross-sectional views showing the fifth and sixth embodiments of the invention.

FIG. 11 is a cross-sectional view showing a structure of the fifth embodiment of the invention. In the diagram, the same components as those in FIG. 9 are designated by the same reference numerals and their detailed descriptions are omitted. In the fifth embodiment, absorbing layers 80, 81, and 82 have an NiPi structure as shown in FIG. 5 mentioned above. With this structure, the light on the long wavelength side of a lower energy than 0.87 μm which has been known as an absorbing end of GaAs can be detected.

Figure 12:
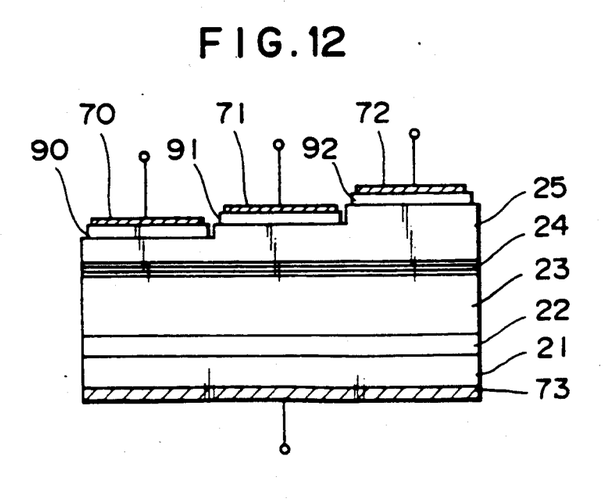

FIG. 12 is a cross-sectional view showing a structure of the sixth embodiment of the invention. In the diagram, the same components as those in FIG. 9 are designated by the same reference numerals and their detailed descriptions are omitted. In the sixth embodiment, absorbing layers 90, 91 and 92 have a super lattice structure as shown in FIG. 7 mentioned above. With such a structure, the wavelength of the light to be detected can be changed by changing the mixed crystal rati of In as mentioned above.

The invention is not limited to the above embodiments but many various modifications are possible. For instance, when the InGaAsInP system is used for the waveguide layer, if InGaAsP having a different mixed crystal ratio is used as absorbing layers, the branch detection similar to that in the invention can be also executed even in the long wavelength band. On the other hand, crystalline layers of Si and Ge can be also grown as absorbing layers. In addition, a three-dimensional waveguide such as buried type, diffusion type, or the like can be also used as a waveguide.

The invention incorporates all of the above modifications without departing from the spirit and scope of the appended claims of the invention.

What is claimed is:

1. A photodetector comprising:
 a waveguide layer to propagate a first light having a first wavelength and a second light having a second wavelength, wherein the second wavelength is longer than the first wavelength;
 a lead layer laminated onto said waveguide layer having a refractive index smaller than that of said waveguide layer, said clad layer having first and second portions having first and second thicknesses, respectively, wherein the first thickness is different than the second thickness; and
 first and second photoelectric converting devices provided on respective surfaces of said first and second portions of said clad layer on a first side opposite to a second side, the second side facing said waveguide layer,
 wherein the first thickness is such that a first base portion of a first electric field distribution of the first light propagated through said waveguide layer impinges upon said first photoelectric converting device but a second base portion of a second electric field distribution of the second light propagated through said waveguide layer is prevented from impinging upon said first photoelectric converting device, sand
 wherein the second thickness is such that the second base portion of the second electric field of the second light impinges upon said second photoelectric converting device.

2. A photoelectric converting according to claim 1, wherein said first and second photoelectric converting devices are arranged in a direction of propagation of the first and second lights.

3. A photodetector according to claim 1, wherein said fist and second photoelectric converting devices are arranged in a direction perpendicular to a direction of propagation of the first and second lights.

4. A photodetector according to claim 1, wherein said first and second photoelectric converting devices each comprise a semi-conductor light absorbing layer to generate a photocurrent and an electrode to extract the photocurrent.

5. A photodetector according to claim 4, wherein said light absorbing layer has a multilayer structure in which a non-doped semiconductor layer and an n-type semiconductor layer are alternately laminated on a p-type semiconductor layer.

6. A photodetector according to claim 4, wherein said light absorbing layer has a super lattice structure in which a well layer and a barrier layer are alternately laminated.

7. A photodetector according to claim 1, further comprising a substrate on which said waveguide layer and said clad layer are formed.

8. A photodetector according to claim 7, further comprising a second clad layer provided between said substrate and said waveguide layer.

9. A photodetector according to claim 8, further comprising a buffer layer provided between said substrate and said second clad layer.

10. A photodetector according to claim 1, wherein said waveguide layer further propagates a third light having a third wavelength longer than the second wavelength, wherein said clad layer has a third portion having a third thickness thinner than each of the first and second portions, wherein a third photoelectric converting device is provided on a surface of the third portion of said clad layer on the first side, wherein the second thickness is such that a third base portion of a third electric field distribution of the third light propagated through said waveguide layer is prevented from impinging upon said second photoelectric converting device, and wherein the third thickness is such that the third base portion of the electric field distribution of the third light propagated through said waveguide layer impinges upon said third photoelectric converting device.

* * * * *

UNITED STATES PATENT AND TRADEMARK OFFICE
CERTIFICATE OF CORRECTION

PATENT NO. : 5,032,710

DATED : July 16, 1991

INVENTOR(S) : HIDETOSHI NOJIRI

Page 1 of 2

It is certified that error appears in the above-identified patent and that said Letters Patent is hereby corrected as shown below:

COLUMN 1

Line 11, "selected" should read --selected in--.
Line 12, "in" should be deleted.
Line 27, "signal light" should read --light signal--.
Line 57, "problem" should read --problems--.

COLUMN 2

Line 13, "light absorbing" should read --light-absorbing--.
Line 15, "view" should read --view showing the third embodiment of the invention;--.
Line 17, "light absorbing" should read --light-absorbing--.

COLUMN 4

Line 31, "laYer" should read --layer--.
Line 32, "method" should read --method,--.
Line 44, "above" should read --above.--.
Line 65, "are" should read --are expressed as follows--.
Line 67, "$n_f > n_s => n_c$" should read --$n_f > n_s \geq n_c$--.

COLUMN 5

Line 3, "$\lambda_2$ (0.8 μm)." should read --$\lambda_2$ (0.8 μm),--.
Line 30, "$V_{out} = {}_{Rs}{}^{fR}(V_2 - V_1)$" should read --$V_{out} = \frac{R_f}{R_s}(V_2 - V_1)$--.

Line 58, "rati of" should read --ratio of--.

UNITED STATES PATENT AND TRADEMARK OFFICE
CERTIFICATE OF CORRECTION

PATENT NO. : 5,032,710

DATED : July 16, 1991

INVENTOR(S) : HIDETOSHI NOJIRI

It is certified that error appears in the above-identified patent and that said Letters Patent is hereby corrected as shown below:

COLUMN 6

Line 12, "lead" should read --clad--.
Line 36, "photoelectric converting" should read --photodetector--.
Line 41, "fist" should read --first--.
Line 46, "light absorbing" should read --light-absorbing--.
Line 50, "light absorbing" should read --light-absorbing--.
Line 55, "light absorbing" should read --light-absorbing--.

Signed and Sealed this

Fourth Day of May, 1993

Attest:

MICHAEL K. KIRK

*Attesting Officer*   *Acting Commissioner of Patents and Trademarks*